(12) United States Patent  
Nagata et al.

(10) Patent No.: US 8,432,445 B2  
(45) Date of Patent: Apr. 30, 2013

(54) AIR CONDITIONING CONTROL BASED ON A HUMAN BODY ACTIVITY AMOUNT

(75) Inventors: Kazumi Nagata, Fuchu (JP); Takaaki Enohara, Hino (JP); Kenji Baba, Kodaira (JP); Shuhei Noda, Fuchu (JP); Nobutaka Nishimura, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 273 days.

(21) Appl. No.: 12/877,685

(22) Filed: Sep. 8, 2010

(65) Prior Publication Data

US 2011/0205371 A1 Aug. 25, 2011

(30) Foreign Application Priority Data

Feb. 24, 2010 (JP) ................. P2010-038427

(51) Int. Cl.
  *H04N 7/18* (2006.01)
  *H04N 9/47* (2006.01)
  *H04N 5/235* (2006.01)
  *H04N 5/228* (2006.01)

(52) U.S. Cl.
  USPC ................. 348/143; 348/77; 348/222.1

(58) Field of Classification Search ............ 348/143, 348/77, 148, 207.99, 152, 155, 156, 161, 348/207.1, 222.1, 373, 375
  See application file for complete search history.

(56) References Cited

U.S. PATENT DOCUMENTS 5,156,203 A * 10/1992 Funakoshi et al. ........... 165/207  
6,645,066 B2 * 11/2003 Gutta et al. .................. 454/229

(Continued)

FOREIGN PATENT DOCUMENTS

CN 101051223 A 10/2004  
CN 1851338 A 10/2006

(Continued)

OTHER PUBLICATIONS

European Search Report issued by the European Patent Office on Apr. 26, 2011, for European Patent Application No. 10175289.7.

(Continued)

*Primary Examiner* — Nicholas Giles  
(74) *Attorney, Agent, or Firm* — Finnegan, Henderson, Farabow, Garrett & Dunner, L.L.P.

(57) ABSTRACT

According to one embodiment, an image processing apparatus connected to a camera device that images a processing target includes: an image information acquisition unit; an accumulation subtraction image information creation unit; a feature amount information creation unit; and an action content identification unit. The image information acquisition unit sequentially acquires, from the camera device, image information formed by imaging the processing target thereby. Based on a temporal change of the image information acquired by the image information acquisition unit, the accumulation subtraction image information creation unit accumulates subtraction information for a predetermined period, which is made by motions of a person present in a room, and creates multivalued accumulation subtraction image information. The feature amount information creation unit creates feature amount information in the accumulation subtraction image information, which is created by the accumulation subtraction image information creation unit, from a region where there is a density gradient in the accumulation subtraction image information. The action content identification unit identifies an action content of the person present in the room from the feature amount information created by the feature amount information creation unit.

12 Claims, 5 Drawing Sheets

U.S. PATENT DOCUMENTS

| | | | | |
|---|---|---|---|---|
| 6,707,486 | B1* | 3/2004 | Millet et al. | 348/155 |
| 7,255,161 | B2* | 8/2007 | Durach et al. | 165/202 |
| 7,620,202 | B2* | 11/2009 | Fujimura et al. | 382/103 |
| 2001/0043230 | A1* | 11/2001 | Furusawa et al. | 345/700 |
| 2003/0096572 | A1* | 5/2003 | Gutta et al. | 454/229 |
| 2004/0194945 | A1* | 10/2004 | Durach et al. | 165/202 |
| 2004/0254699 | A1* | 12/2004 | Inomae et al. | 701/36 |
| 2005/0025345 | A1* | 2/2005 | Ohta et al. | 382/116 |
| 2005/0057652 | A1* | 3/2005 | Tagawa et al. | 348/154 |
| 2005/0058337 | A1* | 3/2005 | Fujimura et al. | 382/159 |
| 2009/0031741 | A1* | 2/2009 | Hara et al. | 62/239 |
| 2009/0210193 | A1* | 8/2009 | Nagase | 702/152 |
| 2010/0130808 | A1* | 5/2010 | Hattori | 600/9 |
| 2011/0032423 | A1* | 2/2011 | Jing et al. | 348/552 |
| 2011/0035348 | A1* | 2/2011 | Chen et al. | 706/47 |
| 2011/0187812 | A1* | 8/2011 | Sankai | 348/14.08 |

FOREIGN PATENT DOCUMENTS

| | | | |
|---|---|---|---|
| CN | 101504169 A | | 8/2009 |
| CN | 101603720 A | | 12/2009 |
| JP | 08-178390 | | 7/1996 |

OTHER PUBLICATIONS

Yin et al., "Face Model Adaption with Active Tracking," IEEE (Oct. 24, 1999), 4:192-196.

Bobick et al., "The Recognition of Human Movement Using Temporal Templates," IEEE Transactions on Pattern Analysis and Machine Intelligence (Mar. 2001), 23:257-267.

Leng et al., "Video Object Segmentation Based on Accumulative Frame Difference," Picture Coding Symposium (Nov. 2007), XP30080489.

Yi et al., "Accumulative Difference Method for Human Body Motion Segmentation in a Real-World Scene," IEEE Pacific Rim Conference on Communications, Computer and Signal Processing (May 1991), pp. 737-740.

Jain, "Difference and accumulative difference pictures in dynamic scene analysis," Image and Vision Computing (May 1984), 2:99-108.

Takaaki Enohara et al.; "Air Conditioning Control System and Air Conditioning Control Method", U.S. Appl. No. 12/874,309, filed Sep. 2, 2010.

Official Action issued Mar. 4, 2013 in Chinese Application No. 201010277894.0, 8 pages.

* cited by examiner

AIR CONDITIONING CONTROL BASED ON A HUMAN BODY ACTIVITY AMOUNT

CROSS-REFERENCE TO RELATED ART

This application is based upon and claims the benefit of priority from Japanese Patent Application No. 2010-038427, filed on Feb. 24, 2010; the entire contents of which are incorporated herein by reference.

FIELD

Embodiments described herein relate generally to an image processing apparatus, an image processing method, and an air conditioning control apparatus.

BACKGROUND

In an interior space of a building, it is required to ensure an appropriate interior environment by air conditioning control with energy consumption as small as possible. In the event of ensuring an appropriate interior thermal environment, it is important to consider a thermal sensation such as heat and cold sensations felt by a person.

In the case where, in an amount of heat generated by the person (that is, sum of radiant quantity by convection, heat radiation amount by radiating body, amount of heat of vaporization from the person, and amount of heat radiated and stored by respiration), a thermal equilibrium thereof is maintained, then it can be said that human body is in a thermally neutral state, and is in a comfortable state where the person does not feel hot or cold with regard to the thermal sensation. On the contrary, in the case where the thermal equilibrium is disturbed, then human body feels hot or cold.

There is an air conditioning control system that achieves optimization of the air conditioning control by using a predicted mean vote (PMV) as an index of the human thermal sensation, which is based on a thermal equilibrium expression. The air conditioning control system using the PMV receives, as variables affecting the thermal sensation, six variables, which are: an air temperature value; a relative humidity value; a mean radiant temperature value; an air speed value; an activity (internal heat generation amount of human body) value; and a clothes wearing state value. Then, the air conditioning control system calculates a PMV value.

Among the six variables to be inputted, those measurable with accuracy are the air temperature value, the relative humidity value, and the air speed value. Since it is difficult to directly measure the activity value and such a clothing amount value, values set therefor are usually used. However, it is desired to also measure the activity value and the clothing amount value in real time with accuracy.

Accordingly, as a technology for measuring an activity amount of a person who is present in a room, there is a human body activity amount calculation apparatus described in Document 1 (JP 8-178390 A).

In the human body activity amount calculation apparatus described in document 1, human body in a room is imaged by imaging means, a portion of human body is detected by detecting a shape (arch shape) of a vertex portion of human body from image information thus obtained, and an activity amount of the person concerned, who is present in the room, is calculated based on a moving speed and the like of such a portion of human body. Therefore, the activity amount of the person can be obtained without contacting the human body thereof, whereby accurate air conditioning control can be performed.

DETAILED DESCRIPTION

In general, according to one embodiment, an image processing apparatus connected to a camera device that images a processing target includes an image information acquisition unit, an accumulation subtraction image information creation unit, a feature amount information creation unit, and an action content identification unit. The image information acquisition unit sequentially acquires, from the camera device, image information formed by imaging the processing target thereby. Based on a temporal change of the image information acquired by the image information acquisition unit, the accumulation subtraction image information creation unit accumulates subtraction information for a predetermined period, which is made by motions of a person who is present in a room, and creates multivalued accumulation subtraction image information. The feature amount information creation unit creates feature amount information in the accumulation subtraction image information, which is created by the accumulation subtraction image information creation unit, from a region where there is a density gradient in the accumulation subtraction image information concerned. The action content identification unit identifies an action content of the person, who is present in the room, from the feature amount information created by the feature amount information creation unit.

A description is made below of, as an embodiment, an air conditioning control system that calculates an activity amount of a person, who is present in a room, without contacting the person by using image information formed by imaging an interior (for example, an office inside) as a control target, and performs accurate air conditioning control by using the calculated activity amount.

<Configuration of Air Conditioning Control System Using Air Conditioning Control Apparatus of Embodiment>

Figure 1:
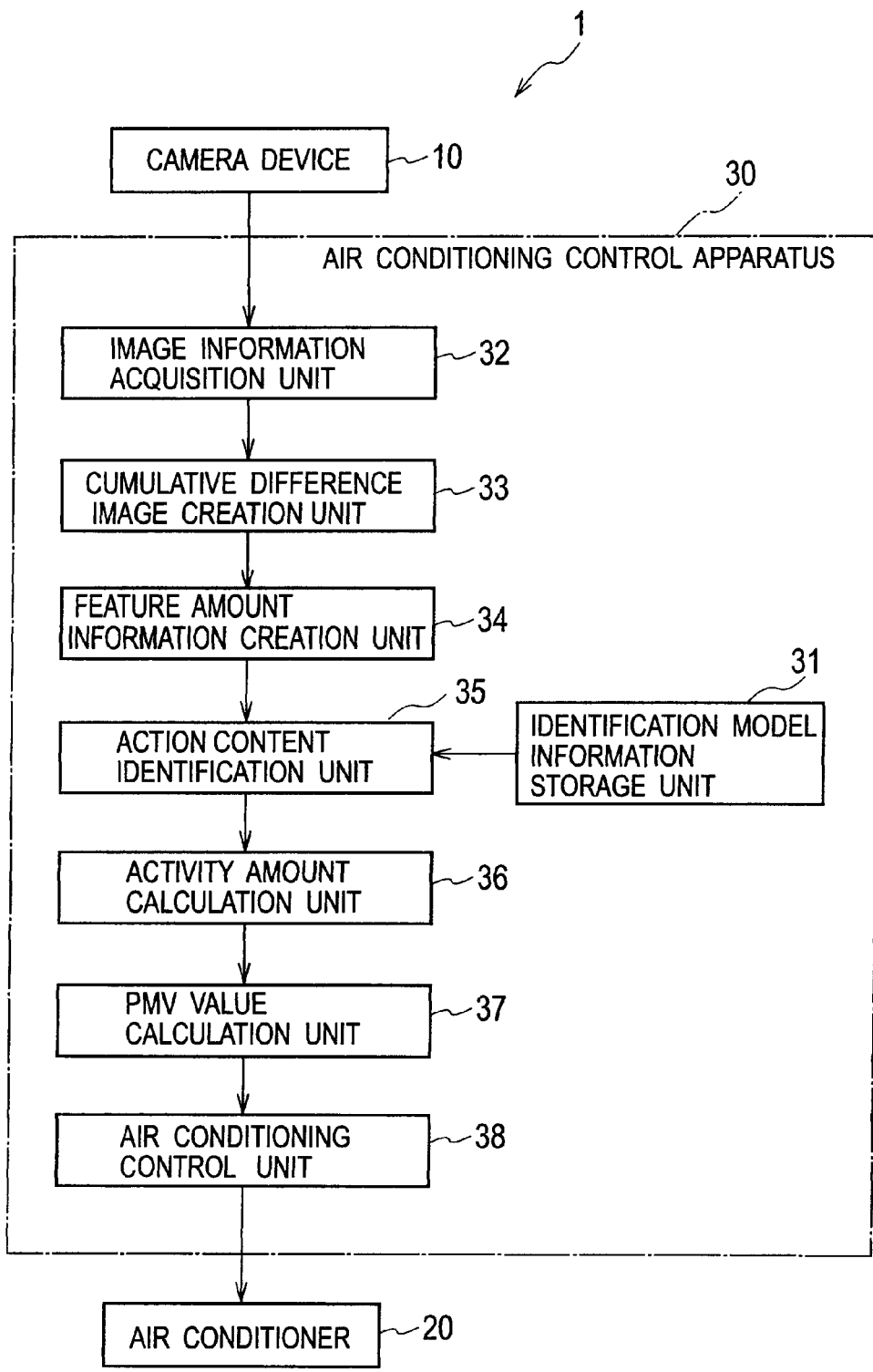
FIG. 1 is a block diagram illustrating a configuration of an air conditioning system using an air conditioning control apparatus of an embodiment.

With reference to FIG. 1, a description is made of a configuration of an air conditioning control system 1 using an air conditioning control apparatus 30 of an embodiment.

The air conditioning control system 1 of the embodiment includes a camera device 10, an air conditioner 20, and the air conditioning control apparatus 30. The camera device 10 is installed for each interior as an air conditioning target and images the interior serving as a target thereof. The air conditioner 20 performs air conditioning for the interior concerned. The air conditioning control apparatus 30 acquires image information formed by imaging the interior by the camera device 10 and controls operations of the air conditioner 20 based on the acquired image information.

For installing position and method of the camera device 10 for use in the embodiment, a variety of modes are conceived. For example, there are: a mode where the camera device 10 is installed, like a surveillance camera, so as to image a space of the interior as the control target from an upper end portion of the interior concerned at an angle of looking down the space of the interior; and a mode where a fish-eye lens or a super-wide angle lens is attached to the camera device 10, and the camera device 10 is installed so as to thereby image such an interior space from a center portion of a ceiling of the interior. Moreover, not only a visible camera but also an infrared camera and the like are usable as the camera device 10.

The air conditioning control apparatus 30 includes: an identification model information storage unit 31; an image information acquisition unit 32; an accumulation subtraction image information creation unit 33; a feature amount information creation unit 34; an action content identification unit 35; an activity amount calculation unit 36; a PMV value calculation unit 37 as a comfort index value calculation unit; and an air conditioning control unit 38. Among such constituents of the air conditioning control apparatus 30, the identification model information storage unit 31, the image information acquisition unit 32, the accumulation subtraction image information creation unit 33, the feature amount information creation unit 34, and the action content identification unit 35 function as constituent units of an image processing apparatus.

The identification model information storage unit 31 prestores, as identification models, a feature amount of the image information for each of the action contents and a threshold value thereof. This identification model may be created off-line in advance, or may be learned and created by on-line acquiring and analyzing information extracted by the feature amount information creation unit 34.

The image information acquisition unit 32 sequentially acquires the image information formed by imaging the processing target by the camera device 10 connected thereto.

The accumulation subtraction image information creation unit 33 extracts subtraction image information among a plurality of frames from image information for a predetermined period, which is acquired in a times series by the image information acquisition unit 32, and creates multivalued accumulation subtraction image information accumulated by superposing the extracted subtraction image information.

The feature amount information creation unit 34 defines, as a feature amount information creation target portion, a region where there is a density gradient in the accumulation subtraction image information created by the accumulation subtraction image information creation unit 33, digitizes a feature of a brightness change of a peripheral region of a pixel or block of the portion concerned, and specifies a positional relationship of the pixel or block of this portion on the image concerned. In such a way, the feature amount information creation unit 34 creates feature amount information in the accumulation subtraction image information concerned.

The action content identification unit 35 identifies an action content of the person, who is present in the room, from the feature amount created by the feature amount information creation unit 34 by using the identification model stored in the identification model information storage unit 31.

The activity amount calculation unit 36 integrates identification results of such action contents obtained from the accumulation subtraction image information concerned in the action content identification unit 35, and calculates an activity amount of the person who is present in the room.

The PMV value calculation unit 37 calculates a PMV value as a comfort index value of the interior as the air conditioning control target from the activity amount of the person present in the room, which is calculated by the activity amount calculation unit 36, and from temperature, humidity, air speed, radiant temperature of the interior as the air conditioning target, and a clothing amount of the person present in the room, which are acquired from an external sensor and the like.

The air conditioning control unit 38 decides a control value for the air conditioner 20, which performs the air conditioning for the interior as the air conditioning target, based on the PMV value calculated by the PMV value calculation unit 37, and transmits the decided control value to the air conditioner 20.

<Operations of Air Conditioning Control System Using Air Conditioning Control Apparatus of Embodiment>

Next, a description is made of operations of the air conditioning control system 1 using the air conditioning control apparatus 30 of the embodiment.

In the embodiment, it is assumed that the feature amount of the image information for each of the action contents and the threshold value thereof are prestored as identification models in the identification model information storage unit 31 of the air conditioning control apparatus 30.

First, the time-series image information created by imaging the interior as the air conditioning target by the camera device 10 is acquired by the image information acquisition unit 32 of the air conditioning control apparatus. The image information acquired by the image information acquisition unit 32 is sent out to the accumulation subtraction image information creation unit 33. Then, the accumulation subtraction image information is created by the accumulation subtraction image information creation unit 33.

Figure 2:
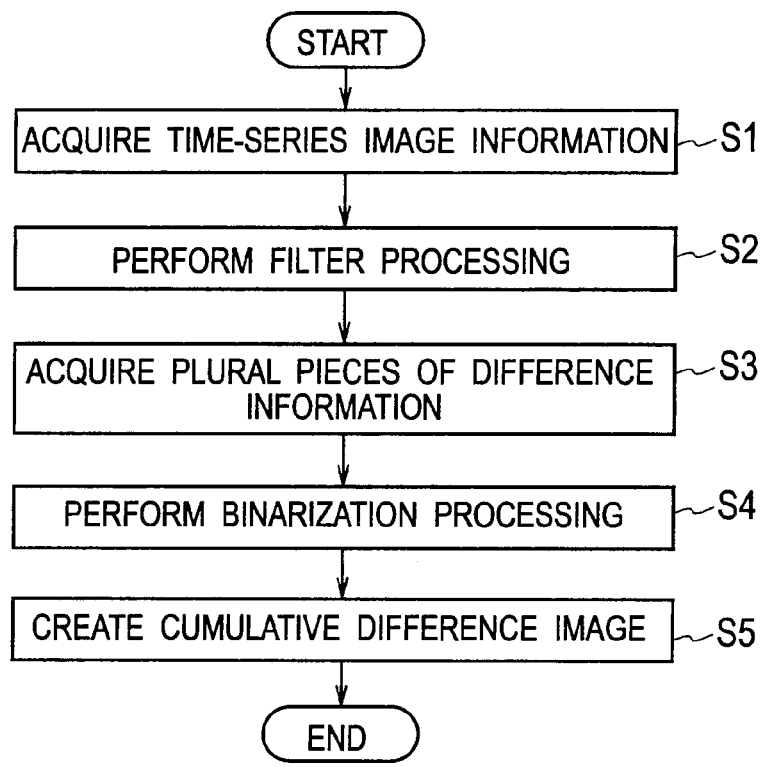
FIG. 2 is a flowchart illustrating operations at a time of creating accumulation subtraction image information in the air conditioning control apparatus of the embodiment.

With reference to a flowchart of FIG. 2, a description is made of processing when the accumulation subtraction image information is created in the accumulation subtraction image information creation unit 33.

When the time-series image information is acquired from the image information acquisition unit 32 (S1), filter processing for noise removal is performed according to needs (S2). For example, a Gaussian filter is applied to this filter processing.

Next, the subtraction image information among the plurality of frames is acquired from the time-series image information for a predetermined period while the filter processing is performed (S3). Binarization processing is performed for the subtraction image information depending on whether or not the acquired subtraction information exceeds the preset threshold value (S4). Such difference-binarized image information subjected to the binarization processing is accumulated for each plural pieces thereof, whereby the accumulation subtraction image information is created (S5).

Examples of the cumulated subtraction image created as described above are illustrated in FIG. 3A and FIG. 3B.

Figure 3A:
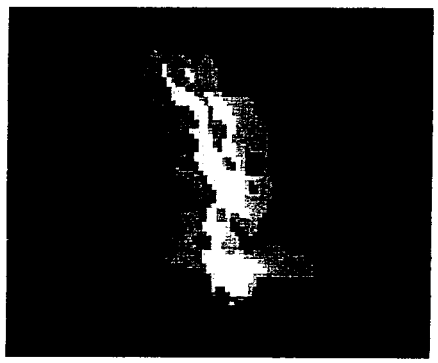
FIGS. 3A and 3B are examples of an accumulation subtraction image created by the air conditioning control apparatus of the embodiment.
Figure 3B:
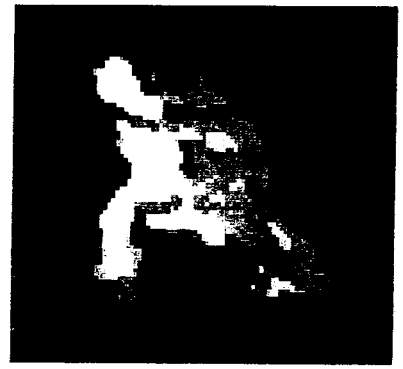

FIG. 3A is an accumulation subtraction image created from the subtraction-binarized image information created among the past image information. Moreover, FIG. 3B is an accumulation subtraction image created from subtraction-binarized image information created among the current (up-to-date) image information and the past image information. As illustrated in FIG. 3A, in the accumulation subtraction image created from the subtraction-binarized image information created among the past image information, a brightness distribution is formed so that image lags can appear in front and rear of a shape portion of a person with a high brightness by a step-by-step density gradient. As illustrated in FIG. 3B, in the accumulation subtraction image created from the subtraction-binarized image information created among the current (up-to-date) image information and the past image information, a brightness distribution is formed so that an image lag can appear in the rear of a shape portion of the person with a high brightness by a step-by-step density gradient.

Figure 4:
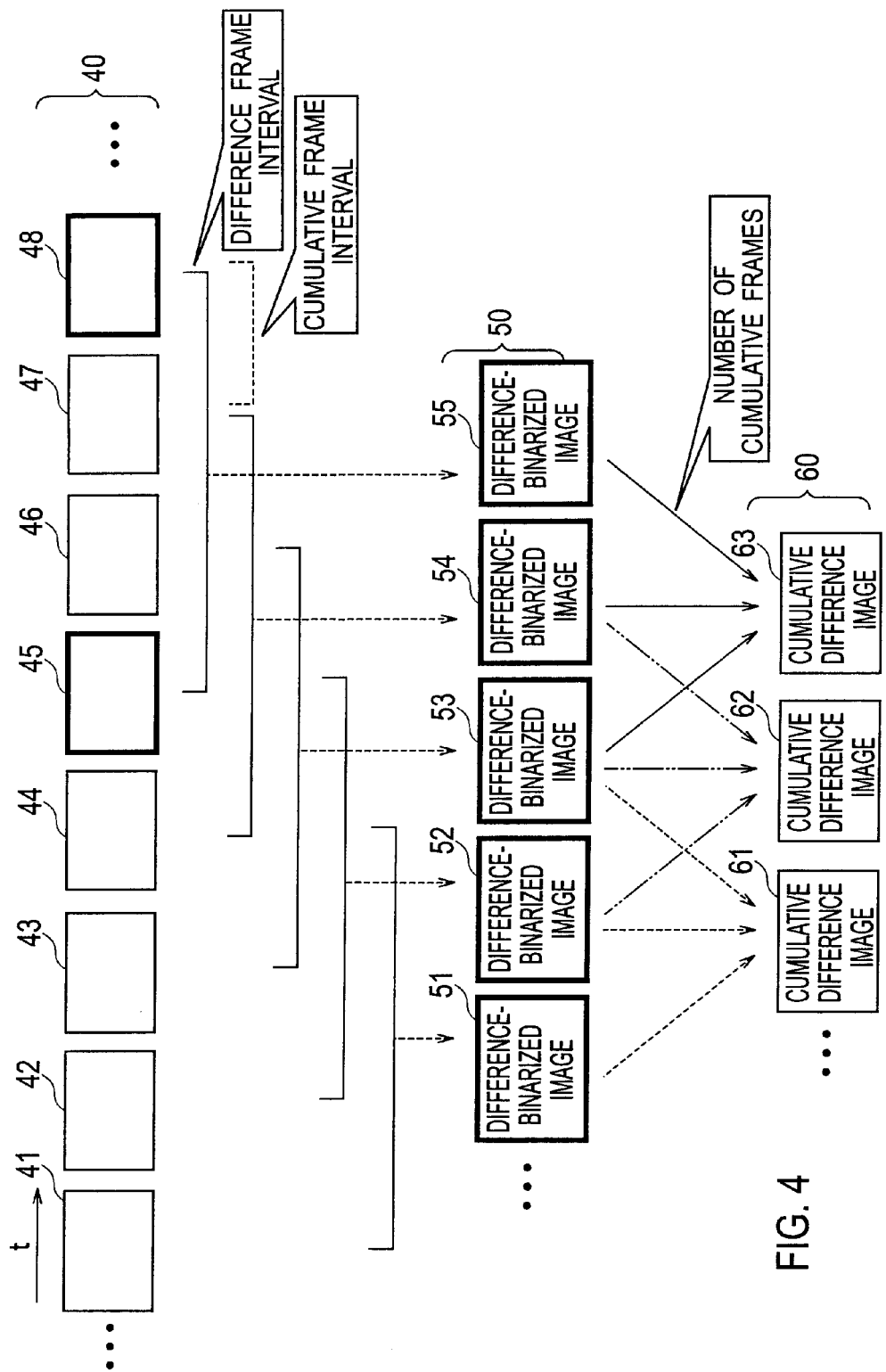
FIG. 4 is an explanatory view illustrating a relationship between frames when the accumulation subtraction image information is created by the air conditioning control apparatus of the embodiment.

As an example of the above, with reference to FIG. 4, a description is made of processing when the subtraction-binarized image information is created among the past image information, and the accumulation subtraction image is created from the created binarized image information. Here, it is assumed that frames 41 to 48 are acquired as time-series image information 40. Moreover, as parameters for creating the accumulation subtraction image information from a plurality of time-series frames, a subtraction frame interval as an interval between two frames to be compared with each other for acquiring the subtraction-binarized image information is set at a three-frame interval. A cumulative frame interval as an interval at which the subtraction image information formed by the comparison at this three-frame interval is created is set at a one-frame interval. The number of cumulative frames of the subtraction-binarized image information for creating the accumulation subtraction image information is set at three frames.

The parameters are set as described above, whereby, as illustrated in FIG. 4, subtraction information between the frame 41 and the frame 44 is acquired, and is subjected to the binarization processing, and a subtraction-binarized image 51 is created. Subtraction information between the frame 42 and the frame 45 is acquired, and is subjected to the binarization processing, and a subtraction-binarized image 52 is created. Subtraction information between the frame 43 and the frame 46 is acquired, and is subjected to the binarization processing, and a subtraction-binarized image 53 is created. Subtraction information between the frame 44 and the frame 47 is acquired, and is subjected to the binarization processing, and a subtraction-binarized image 54 is created. Subtraction information between the frame 45 and the frame 48 is acquired, and is subjected to the binarization processing, and a subtraction-binarized image 55 is created.

The binarization processing is performed as described above, whereby a color subtraction, and the like among person's clothes, a background and the like are absorbed, and a portion regarding the person's motion is stably extracted. Moreover, expansion or contraction processing may be added in order to remove a hole and a chipped portion, which may be caused by the binarization processing.

Next, the created subtraction-binarized images 51 to 55 are accumulated in a time axis direction by a predetermined number of cumulative frames, whereby multivalued accumulation subtraction images are created. In the embodiment, the number of cumulative frames is three frames. Therefore, as illustrated in FIG. 4, the subtraction-binarized images 51 to 53 are accumulated, and an accumulation subtraction image 61 is created. The subtraction-binarized images 52 to 54 are accumulated, and an accumulation subtraction image 62 is created. The subtraction-binarized images 53 to 55 are accumulated, and an accumulation subtraction image 63 is created.

Figure 5C:
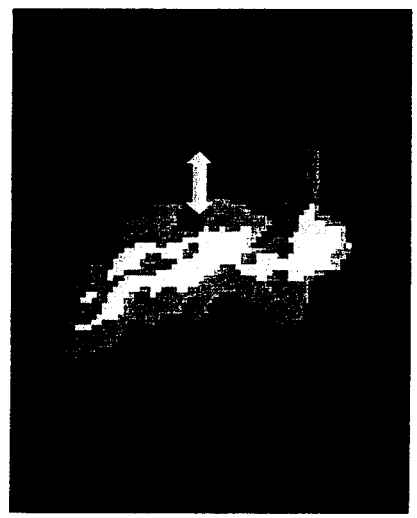
FIGS. 5A, 5B, and 5C are examples of accumulation subtraction images of a person who moves at different speeds, the accumulation subtraction images being created by the air conditioning control apparatus of the embodiment.
Figure 5B:
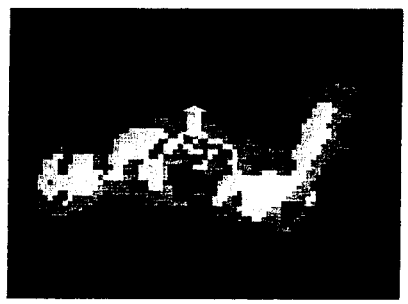
Figure 5A:
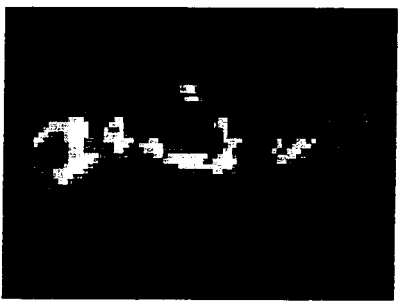

An image lag formed by a step-by-step density gradient of the multivalued accumulation subtraction images created as described above is narrowed as illustrated in FIG. 5A in the case where a moving speed of the person is slow, and is widened as illustrated from FIG. 5B to FIG. 5C as the moving speed of the person gets faster.

Accordingly, such parameters as the above-mentioned subtraction frame interval, cumulative frame interval, and number of cumulative fames are made variable in response to an environment and the action content, which are calculation targets of the activity amount, whereby the action content can be detected with accuracy.

For example, in an interior such as an office inside where person's motions are small, the subtraction frame interval and the cumulative frame interval are increased, and in a space such as a department store where the person's motions are large, the subtraction frame interval and the cumulative frame interval are reduced. In such a way, it becomes easy to recognize an orbit of the movement of each person, and the action content and moving speed of the person can be detected with accuracy.

The accumulation subtraction image information may be created sequentially in the time series, or may simultaneously create plural pieces of the accumulation subtraction image information.

Next, a description is made below of processing when the feature amount indicating the moving speed of the person's portion is calculated in the feature amount information creation unit 34 from the accumulation subtraction image information created by the accumulation subtraction image information creation unit 33.

As mentioned above, in the accumulation subtraction image created from the subtraction-binarized image information created among the past image information, the image lags appear in front and rear of the shape portion of the person with the high brightness by the step-by-step density gradient. Moreover, in the accumulation subtraction image created from the subtraction-binarized image information created among the current (up-to-date) image information and the past image information, the image lag appears in the rear of the shape portion of the person with the high brightness by the step-by-step density gradient.

Accordingly, in the feature amount information creation unit 34, in such a portion of the image lag by the density gradient, which appears on the periphery of the shape portion of the person, digitized brightness distribution information on the periphery of a certain pixel or block is detected for a predetermined number of directional lines for each predetermined region, whereby a feature amount in the accumulation subtraction image information is created. Information of this feature amount can contain: brightness values of the respective lines, which are written in order from the center to the periphery; relative values indicating brightness changes from adjacent pixels in the respective lines; and data for coping with geometrical characteristics of the camera device. The data for coping with the geometrical characteristics of the camera device is positional information on the image, such as an x-coordinate and y-coordinate of the pixel concerned or the block concerned, and a distance thereof from the center of the image. Moreover, for the feature amount information, it is possible to perform normalization and weighting, which correspond to the variations and distribution of the values, and according to needs, it is also possible to perform enhancement of priority for brightness information effective for the identification, and to perform addition or summation for information regarding positions on the image.

Figure 6:
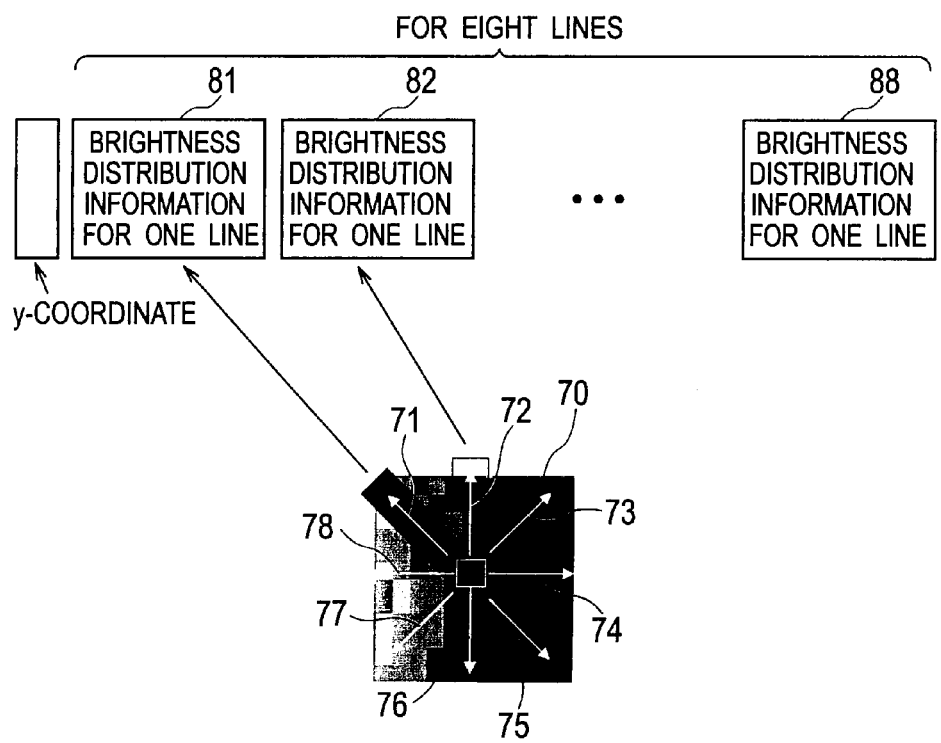
FIG. 6 is an explanatory view illustrating a state when feature amount information is created from a part of the accumulation subtraction image information created by the air conditioning control apparatus of the embodiment.

An example of the predetermined region of the image lag portion, which is defined as the feature amount creation target, is illustrated in FIG. 6.

This region 70 as the feature amount creation target is a square region with a 15 by 15 matrix of pixels. Here, the case is illustrated, where brightness distribution information in lines of eight directions (respective directions of arrows 71 to 78) from a center pixel is detected.

In the case where the feature amount is created for this region 70, brightness values are first acquired as the brightness distribution information sequentially from centers of the respective lines to the peripheries thereof, and further, relative values indicating brightness changes among pixels adjacent to one another are acquired from the centers concerned toward the peripheries thereof.

Next, the sums of brightness values of the respective lines are calculated from the brightness values contained in the brightness distribution information, and the brightness distribution information is arrayed in a clockwise or counterclockwise order from, as the head, the line in which the sum of the brightness values is the maximum.

In FIG. 6, it is determined that the sum of the brightness values of the line in the direction of the arrow 71 among the lines in the eight directions is the maximum. Then, the brightness distribution information for the eight lines in the order of the arrows 72, 73, . . . , and 78 is arrayed like brightness distribution information 81, 82, . . . , and 88 in the clockwise direction from the line of the arrow 71 as the head.

The matter that the sum of the brightness values of the brightness distribution information is large refers to a direction where the direction approaches the shape portion of the person with the high brightness. Specifically, it is estimated that the direction (direction of the line in which the sum of the brightness values is the maximum) of the arrow 71 arrayed at the head is a moving direction of the person concerned. As described above, the moving direction of the person is estimated from the sum of the brightness values, whereby it becomes possible to identify the movement in every direction without holding dependency on the moving direction.

Meanwhile, in the case where the dependency on the moving direction of the person is desired to be given, brightness values of the respective lines may be extracted to be used as feature amount data without performing such sorting processing based on the sums of the brightness values among the above-mentioned processing.

As the digitized brightness distribution information on the periphery of the pixel or the block, there may be used brightness distribution information formed by combining information regarding peripheral regions of a plurality of pixels or blocks, or information formed by combining brightness distribution information created based on accumulation subtraction image information in a plurality of time ranges.

Next, in the action content identification unit 35, the identification models stored in the identification model information storage unit 31 are used, and the action content (standing, walking, running, and so on) of the person present in the room is identified from the feature amount calculated by the feature amount calculation unit.

An example of the identification models is created by applying the support vector machine (SVM), the neutral network, the Bayes classifier and the like, which are typical methods for pattern recognition. The SVM is a method that is originated from the optimal separating hyperplane devised by Vapnik, et al. in 1960's, and is expanded to a nonlinear identification method combined with kernel learning methods in 1990's. For example, in the case of applying, to the SVM, vSVM to which a parameter v for controlling a tradeoff between complexity and loss of the model is introduced, v, γ, and the kernel are present as parameters, and these are appropriately selected, whereby highly accurate identification can be realized.

Next, the identification results of the action contents obtained on the pixel basis or the block basis in the action content identification unit 35 are integrated by the activity amount calculation unit 36, and the activity amount of each person present in the room or a mean activity amount in the room is calculated.

Here, in the case where the activity amount of each person present in the room is calculated, the activity amount may be calculated from the action content identified based on the feature amount of the peripheral region of the person's portion after the person's portion concerned is extracted from the image information. Moreover, processing such as clustering is performed for a distribution of the action contents identified based on feature amounts for person's motions in the whole of the room without performing the extraction of the person's portions, and the person's positions are estimated, whereby activity amounts of the respective persons may be calculated. Moreover, in consideration that a size of such an imaging target on the image differs depending on a positional relationship between the camera device and the imaging target concerned, a frame for designating a region from which the activity amounts are to be calculated is set in advance on the image, whereby the activity amount of each person present in the room may be calculated based on identification results in the frame.

Moreover, in the case where the mean activity amount in the room is calculated, the mean activity amount may be calculated in such a manner that the activity amounts of the respective persons in the room, which are calculated as mentioned above, are averaged, or that the mean activity amount in the rooms is estimated from a relationship between an identification result obtained from the whole of the image and an imaging area without extracting the person's portions. In this case, the identification result, the distribution and number of the persons in the room, which are obtained from the image information, and the information regarding a space of the imaging area are integrated, and an activity amount that is optimum for use in calculating the PMV value is calculated.

Next, in the PMV value calculation unit 37, the PMV value as the comfort index value in the room as the air conditioning control target is calculated from the activity amount calculated by the activity amount calculation unit 36, and from the temperature, humidity, air speed, and radiant temperature of the interior as the air conditioning target, and the clothing amount of the person present in the room, which are acquired from the external sensor and the like.

Next, in the air conditioning control unit 38, the control value for the air conditioner 20, which performs the air conditioning for the interior as the air conditioning target, is decided based on the PMV value calculated by the PMV value calculation unit 37, and the decided control value is transmitted to the air conditioner 20, whereby the operations of the air conditioner 20 are controlled.

As described above, in accordance with the air conditioning system of the embodiment, the accumulation subtraction image information formed by extracting and accumulating the subtraction image information among the plurality of frames is created from the image information for the predetermined period, which is formed by imaging the interior as the air conditioning target, and the image lag portion of the person's portion appearing on this accumulation subtraction image information is analyzed, whereby the highly accurate activity amount is calculated. Then, efficient air conditioning can be executed based on circumstances of the interior environment calculated based on the activity amount concerned.

In the above-described embodiment, at the time of creating the accumulation subtraction image information, there may be used not only the subtractions among the frames but also background subtractions, subtraction values in an optical flow (velocity field of object), moving orbit, affine invariant, projective invariant and the like of the object, or physical amounts of these.

Moreover, it is also conceivable that the feature amount information is formed as follows.

In the image information of the imaged interior, in terms of the geometrical characteristics of the camera device, as the imaging target is moving away from the camera device, the size of the imaging target on the image information becomes smaller, and as the imaging target is approaching the camera device, the size of the imaging target on the image information becomes larger. Therefore, a width of the image lag appearing on the accumulation subtraction image information is changed not only by the moving speed of the person but also by the positional relationship between the person and the camera device.

Hence, information on the geometrical characteristics (position on a screen) of the camera is given to the feature amount information in order to correctly detect the action content at any position within an angle of view without depending on the position of the person on the screen.

Figure 7A:
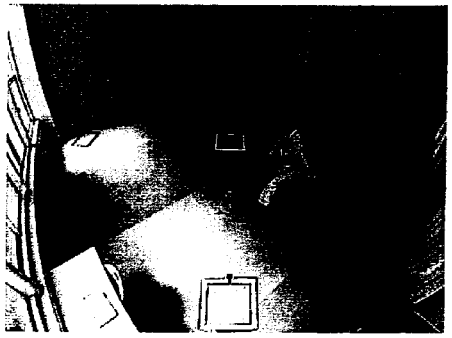
FIGS. 7A and 7B are examples of image information acquired by the air conditioning control apparatus of the embodiment.

Specifically, when the camera device is installed at the angle of looking down the interior space from the upper end portion of the interior, then as illustrated in FIG. 7A, the imaging target is displayed on an upper portion of the display screen as moving away from the camera device, and is displayed on a lower portion of the display screen as approaching the camera device.

In the case where the imaging target is imaged by the camera device installed as described above, the y-coordinate of the person is adopted as the data for coping with the geometrical characteristics of the camera device.

Figure 7B:
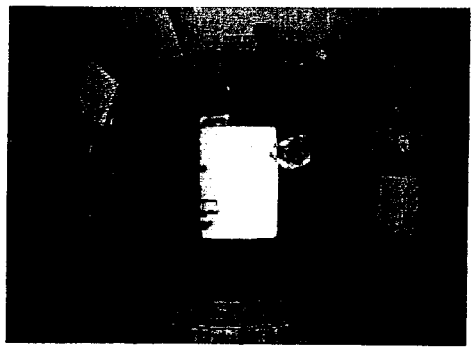

Moreover, when the camera device attached with the fish-eye lens or the super-wide angle lens is installed so as to image the interior space from the center portion of the ceiling of the interior, then as illustrated in FIG. 7B, the imaging target is displayed more largely as being close to the center of the screen, and is displayed smaller as going toward the periphery.

In the case where the imaging target is imaged by the camera device installed as described above, a distance thereof from the center of the screen is adopted as the data for coping with the geometrical characteristics of the camera device.

Then, the identification model to be stored in the identification model information storage unit 31 is created by using the feature amount having the geometrical characteristics of the camera device, whereby the action content identification is performed.

In the case where the camera device is installed on the upper end portion of the interior, and the imaging target is imaged at the angle of looking down the interior space, then for example, in order to cope with a motion in every traveling direction, the feature amounts are learned in moving scenes including three types (distant, center, near) in the lateral direction and one type (center) in the longitudinal direction, and the identification models are created.

Moreover, in the case where the camera device attached with the fish-eye lens or the super-wide angle lens is installed on the center portion of the ceiling, and the person is imaged immediately from the above, the feature amounts are learned in moving scenes in the vicinity immediately under the camera device and positions moving away from the camera device, and the identification models are created.

As described above, the action content is identified by using the feature amount information having the brightness information and the information on the geometrical characteristics of the camera, whereby the action content can be correctly detected at any position within the angle of view without depending on the position of the person.

Moreover, with regard to the learning of the feature amounts in the creation of the identification models, in consideration of the geometrical characteristics of the camera for example, based on a feature amount acquired based on an action scene in an environment where the size of the imaging target is large, it is possible to estimate feature amounts in other circumstances. Moreover, based on an action scene in the environment where the size of the imaging target is large, a video of an action scene in an environment where the size of the imaging target is small is created, whereby it is possible to learn the feature amounts based on the video concerned. By using the information thus estimated, types of videos to be imaged for the learning can be reduced, and the number of steps required for the learning can be reduced.

Here, the pixels or the blocks, which are taken as extraction targets of the feature amounts at the time of the learning, can be selected appropriately, and it is not necessary that all of the pixels or all of the blocks in the image be taken as such targets. Moreover, it is not necessary that all of the frames be taken as learning objects, either, and frames to be taken as the learning objects may be selected at a certain interval in response to the moving speed.

As described above, the identification models are updated by the learning, and the feature amounts corresponding to the distances of the person are learned, whereby expansion of a surveillance range in the image information formed by imaging the imaging target can be achieved.

Moreover, it is also conceivable to set the feature amount information as follows.

As mentioned above, the width of the image lag appearing on the accumulation subtraction image information is changed not only by the moving speed of the person but also by the positional relationship between the person and the camera device.

Accordingly, normalization processing is performed for the feature amount information in consideration of the information on the geometrical characteristics (position on the screen) of the camera.

Specifically, when the camera device is installed at the angle of looking down the interior space from the upper end portion of the interior, then the y-coordinate of the person is used as the data for coping with the geometrical characteristics of the camera device, whereby the normalization processing for the feature amount information is performed.

Moreover, when the camera device attached with the fish-eye lens or the super-wide angle lens is installed so as to image the interior space from the center portion of the ceiling of the interior, then the distance of the imaging target from the center of the screen is used as the data for coping with the geometrical characteristics of the camera device, whereby the normalization processing for the feature amount information is performed.

Then, the identification model to be stored in the identification model information storage unit 31 is created by using the feature amount subjected to the normalization processing by using the geometrical characteristics of the camera device, whereby the action content identification is performed.

In such a way, the action content is identified by using the feature amount information subjected to the normalization processing using the information on the geometrical characteristics of the camera, whereby the action content can be correctly detected at any position within the angle of view without depending on the position of the person. Moreover, also in the learning of the identification models, the feature amounts can be estimated by performing the normalization processing. Therefore, the number of steps required for the learning can be reduced.

In the foregoing embodiment, the description has been made of the case of using the identification models at the time of identifying the action contents. However, the mode for carrying out the invention is not limited to this, and for example, the action contents may be identified based on threshold values of the feature amounts for identifying the respective preset action contents (standing, walking, running, and so on).

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus for processing frames captured by a camera device, comprising:
   an image information acquisition unit that acquires image information including a plurality of frames sequentially captured by the camera device in time series;
   an accumulation subtraction image information creation unit that accumulates binarized subtraction image information including a plurality of binarized subtraction images each acquired by subtracting a predetermined frame from a corresponding frame in the image information, the binarized subtraction image information being made by motions of one or more persons present in a room, and creates multivalued accumulation subtraction image information including a plurality of multivalued accumulation subtraction images each acquired by adding a predetermined number of corresponding binarized subtraction images in the binarized subtraction image information;
   a feature amount information creation unit that creates feature amount information from the multivalued accumulation subtraction image information, the feature amount information including a plurality of feature amounts, one feature amount created from a brightness change region where there are brightness gradients in a corresponding multivalued accumulation subtraction image; and
   an action content identification unit that identifies an action content of the persons from the feature amount information.

2. The image processing apparatus according to claim 1, wherein
   each of the feature amounts is created from digitized information formed by digitizing brightness changes in a peripheral region of a pixel or a block in the brightness change region in the corresponding multivalued accumulation subtraction image, and from positional information of the pixel or the block.

3. The image processing apparatus according to claim 2, wherein
   the digitized information created by a plurality of brightness distribution arrays each digitizing brightness changes of a predetermined number of pixels or blocks in each of a predetermined number of directions around the pixel or the block in the peripheral region of the pixel or the block.

4. The image processing apparatus according to claim 3, wherein
   the digitized information is created by arraying the brightness distribution arrays in clockwise or counter clockwise from, as a head, one of the brightness distribution arrays in which a sum of brightness values is maximum.

5. The image processing apparatus according to claim 3, wherein
   the digitized information is formed by combining information regarding peripheral regions of a plurality of pixels or the blocks in the corresponding multivalued accumulation subtraction image, or by combining information created based on a plurality of corresponding multivalued accumulation subtraction images in the multivalued accumulation subtraction image information.

6. The image processing apparatus according to claim 4, wherein
   the digitized information is formed by combining information regarding peripheral regions of a plurality of pixels or the blocks in the corresponding multivalued accumulation subtraction image, or by combining information created based on a plurality of corresponding multivalued accumulation subtraction images in the multivalued accumulation subtraction image information.

7. The image processing apparatus according to claim 1, further comprising:
   an identification model information storage unit that prestores, as an identification model, identification information for each action content, wherein,
   by using the identification model, the action content identification unit identifies the action content of the persons from the feature amount information.

8. The image processing apparatus according to claim 7, wherein
   the identification model contains feature amount information in another imaging environment, the feature amount information being estimated based on feature amount information acquired from an action of an imaging target imaged in a predetermined imaging environment.

9. The image processing apparatus according to claim 1, wherein
   based on a threshold value preset for each action content, the action content identification unit identifies the action content of the persons from the feature amount information.

10. The image processing apparatus according to claim 1, wherein
    the binarized accumulation subtraction image information is created by using any of subtractions among frames, background subtractions, subtraction values in an optical flow, subtraction values in moving orbit, subtraction values of affine invariant, and subtraction values of projective invariant of an object.

11. An image processing method using an image processing apparatus for processing frames captured by a camera device, the image processing method comprising:
    acquiring image information including a plurality of frames sequentially captured by the camera device in time series;

based on a temporal change of the image information, accumulating binarized subtraction image information including a plurality of binarized subtraction images each acquired by subtracting a predetermined frame from a corresponding frame in the image information, the binarized subtraction image information being made by motions of one or more persons present in a room, and creating multivalued accumulation subtraction image information including a plurality of multivalued accumulation subtraction images each acquired by adding a predetermined number of corresponding binarized subtraction images in the binarized subtraction image information;

creating feature amount information from the multivalued accumulation subtraction image information, the feature amount information including a plurality of feature amounts, one feature amount created from a brightness change region where there are brightness gradients in a corresponding multivalued accumulation subtraction image; and identifying an action content of the persons from the feature amount information.

12. An air conditioning control apparatus using a camera device installed in an interior as an air conditioning control target for controlling an air conditioner that performs air conditioning for the interior as the air conditioning control target, the air conditioning control apparatus comprising:

an image information acquisition unit that acquires image information including a plurality of frames sequentially captured by the camera device in time series;

an accumulation subtraction image information creation unit that accumulates binarized subtraction image information including a plurality of binarized subtraction images each acquired by subtracting a predetermined frame from a corresponding frame in the image information, the binarized subtraction image information being made by motions of one or more persons present in the room, and creates multivalued accumulation subtraction image information including a plurality of multivalued accumulation subtraction images each acquired by adding a predetermined number of corresponding binarized subtraction images in the binarized subtraction image information;

a feature amount information creation unit that creates feature amount information from the multivalued accumulation subtraction image information, the feature amount information including a plurality of feature amounts, one feature amount created from a brightness change region where there are brightness gradients in a corresponding multivalued accumulation subtraction image;

an action content identification unit that identifies an action content of the persons from the feature amount information;

an activity amount calculation unit that calculates an activity amount of the persons from the action content;

a current comfort index value calculation unit that calculates a current comfort index value of the persons based on the activity amount;

a control parameter calculation unit that calculates a control parameter regarding operations of the air conditioner from the current comfort index value; and an air conditioner control unit that controls the operations of the air conditioner based on the control parameter.

* * * * *